(12) United States Patent
Rinerson et al.

(10) Patent No.: US 7,701,834 B2
(45) Date of Patent: Apr. 20, 2010

(54) MOVABLE TERMINAL IN A TWO TERMINAL MEMORY ARRAY

(75) Inventors: Darrell Rinerson, Cupertino, CA (US); Christophe Chevallier, Palo Alto, CA (US); John E. Sanchez, Jr., Palo Alto, CA (US); Lawerence Schloss, Palo Alto, CA (US)

(73) Assignee: Unity Semiconductor Corporation

( * ) Notice: Subject to any disclaimer, the term of this patent is extended or adjusted under 35 U.S.C. 154(b) by 914 days.

(21) Appl. No.: 11/037,971

(22) Filed: Jan. 18, 2005

(65) Prior Publication Data

US 2006/0158998 A1 Jul. 20, 2006

(51) Int. Cl.
*G11B 9/00* (2006.01)
(52) U.S. Cl. ..................................... 369/126
(58) Field of Classification Search ................. 369/126, 369/101
See application file for complete search history.

(56) References Cited

U.S. PATENT DOCUMENTS

| | | | |
|---|---|---|---|
| 3,886,577 A | 5/1975 | Buckley | |
| 4,343,993 A * | 8/1982 | Binnig et al. | 250/306 |
| 5,296,716 A | 3/1994 | Ovshinsky et al. | |
| 6,204,139 B1 | 3/2001 | Liu et al. | |
| 6,473,332 B1 | 10/2002 | Ignatiev et al. | |
| 6,531,371 B2 | 3/2003 | Hsu et al. | |
| 6,597,639 B1 * | 7/2003 | Hamann et al. | 369/13.01 |
| 6,638,627 B2 * | 10/2003 | Potter | 428/446 |
| 6,704,156 B1 | 3/2004 | Baker et al. | |
| 6,753,561 B1 | 6/2004 | Rinerson et al. | |
| 6,836,421 B2 | 12/2004 | Rinerson et al. | |
| 6,856,536 B2 | 2/2005 | Rinerson et al. | |
| 6,940,744 B2 | 9/2005 | Rinerson et al. | |
| 7,315,505 B2 * | 1/2008 | Adelmann | 369/126 |
| 2004/0057372 A1 * | 3/2004 | Schut et al. | 369/126 |
| 2005/0047307 A1 * | 3/2005 | Frommer et al. | 369/101 |
| 2005/0052984 A1 * | 3/2005 | Hong et al. | 369/126 |
| 2005/0147018 A1 * | 7/2005 | Kim et al. | 369/126 |
| 2006/0023606 A1 * | 2/2006 | Lutwyche et al. | 369/100 |

FOREIGN PATENT DOCUMENTS

JP          05182261 A  *  7/1993

OTHER PUBLICATIONS

Vettiger, P. et al., The "Millipede"—Nanotechnology Entering Data Storage, IEEE Transactions of Nanotechnology, vol. 1, No. 1, Mar. 2002.*

Cimpoiasu, E. et al., Aluminum oxide layers as possible components for layered tunnel barriers, Journal of Applied Physics, vol. 96, No. 2, Jul. 15, 2004.*

Eleftheriou, E. et al., Millipede—A MEMS—Based Scanning-Probe Data-Storage System, IEEE Transactions on Magnetics, vol. 39, No. 2, Mar. 2003.*

(Continued)

*Primary Examiner*—Wayne R Young
*Assistant Examiner*—Adam R Giesy

(57) ABSTRACT

A movable terminal in a two terminal memory array. A storage medium is disposed between two terminals, one of the terminals being movable relative to the second terminal. Either one of the terminals or both terminals might actually move, resulting in one terminal being moved relative to the other terminal. A memory element disposed between the two terminals has a conductance that is responsive to a write voltage across the electrodes.

11 Claims, 6 Drawing Sheets

OTHER PUBLICATIONS

Chen, X.; Wu, N.; Strozier, J.; Ignatiev, A., "Spatially extended nature of resistive switching in perovskite oxide thin films", Applied Physics Letters 89 063507 (2006).

A. Baikalov, et al, "Field-driven hysteretic and reversible resistive switch at the Ag-Pr0.7Ca0.3MnO3 interface" Applied Physics Letters, vol. 83, No. 5, Aug. 4, 2003, pp. 957-959.

A. Beck, J. Bednorz, A. Bietsch, Ch. Gerber, C. Rossel, D. Widmer, "Reproducible switching effect in thin oxide films for memory applications," Applied Physics Letters, vol. 77, No. 1, Jul. 3, 2000, pp. 139-141.

A. Sawa, et al, "Hysteretic current-volyage characteristics and resisitance switching at a rectifying $Ti/Pr_{0.7}Ca_{0.3}MnO_3$ interface" Applied Physics Letters, vol. 85, No. 18, Nov. 1, 2004, pp. 4073-4075.

C. Rossel, G.I. Meijer, D. Brémaud, D. Widmer, "Electrical current distribution across a metal-insulator-metal structure during bistable switching," Journal of Applied Physics, vol. 90, No. 6, Sep. 15, 2001, pp. 2892-2898.

David Oxley, "Memory Effects in Oxide Films" in Oxides and Oxide Films, vol. 6, pp. 251-325 (Chapter 4) (Ashok. K. Vijh ed., Marcel Drekker) (1981).

G, Cherubini, et al. "The Millipede, a Dense, Highly Parallel Scanning-Probe Data-Storage System" European Solid State Circuits Conference, Sep. 2002, pp. 121-125.

J.G. Simmons and R.R. Verderber, "New Conduction and Reversible Memory Phenomena in Thin Insulating Films," Proc. Roy. Soc. A., 301 (1967), pp. 77-102.

Liu et al., "A New Concept for Non-Volatile Memory: The Electric-Pulse Induced Resistive Change Effect in Colossal Magnetoresistive Thin Films," Non-Volatile Memory Technology Symposium, Nov. 7, 2001, pp. 1-7.

Liu et al., "Electric-pulse-induced reversible resistance change effect in magnetoresistive films," Applied Physics Letters, vol. 76, No. 19, May 8, 2000, pp. 2749-2751.

M. Albrech et al. "Magnetic coercivity patterns for magnetic recording on patterned media" Applied Physics Letters, vol. 83, No. 21, Nov. 24, 2003, pp. 4363-4365.

Rebecca Howland and Lisa Benatar, "A Practical Guide To Scanning Probe Microscopy," ThermoMicroscopes, Rev 2000.

R.E. Thurstans and D.P. Oxley, "The Electroformed metal-insulator-metal structure: A comprehensive model," J. Phys. D.: Appl. Phys. 35 (2002), Apr. 2, 2002, pp. 802-809.

S. Gidon et al., "Electrical Probe storage using Joule heating in phase change media," Applied Physics Letters, vol. 85, No. 26, Dec. 27, 2004, pp. 6392-6394.

Y. Watanabe, J.G. Bednorz, A. Bietsch, Ch. Gerber, D. Widmer, A. Beck, "Current-driven insulator-conductor transition and nonvolatile memory in chromium-doped $SrTiO_3$ single crystals," Applied Physics Letters, vol. 78, No. 23, Jun. 4, 2001, pp. 3738-3740.

* cited by examiner

MOVABLE TERMINAL IN A TWO TERMINAL MEMORY ARRAY

BACKGROUND OF THE INVENTION

1. Field of the Invention

The present invention relates to re-writeable non-volatile computer memory using mechanical components.

2. Description of the Related Art

Most computers have four types of necessary hardware components: CPU (central processing unit), input device, output device and memory. The CPU executes programs (software) which tell the computer what to do. Input and output (I/O) devices allow the computer to communicate with the user and the outside world. Memory enables a computer to store, at least temporarily, data and programs.

There are many ways in which memory can be categorized. For example, whether the CPU can directly or indirectly access the memory is the distinction between primary and secondary storage and whether the CPU can access any portion of the memory at any time or whether the data must be read in sequence is the distinction between random access media and sequential access media. However, these distinctions are typically necessitated by the underlying technology of the memory.

For example, certain types of memory, such as magnetic tape, are better suited to sequential access media. Similarly, if the underlying technology of a memory allows for very fast access, but loses its data when power is turned off (volatile memory), it may be appropriate for primary storage, but not secondary storage. If the underlying technology allows only slow access, but is non-volatile, secondary storage may be more appropriate. Cost concerns will also drive a technology's implementation. For example, read only memory is typically cheaper than rewritable memory, so it is used whenever data does not need to be changed.

One developing technology is named "Millipede" and is being developed by IBM's Zurich Research Laboratory, as described in "The millipede, a very dense, highly parallel scanning-probe data-storage system," by G. Cherubini, et al. in European Solid-State Circuits Conference, September 2002, pp. 121-125, incorporated herein by reference for all purposes. The technology involves an atomic force microscopy (AFM) tip for reading and thermomechanical writing of topographical features for data storage. Thermomechanical writing is a combination of applying a local force by the cantilever/tip to a polymer layer and softening it by local heating. By applying sufficient heat, an indentation can be formed into the storage medium for writing a bit which can be read back with the same tip. The indentation can be sensed by the fact that the lever is bent when it is moved into the indentation, causing (either directly or indirectly) an electrical resistance change.

There are continuing efforts to improve upon the various memory technologies.

BRIEF DESCRIPTION OF THE DRAWINGS

The invention may best be understood by reference to the following description taken in conjunction with the accompanying drawings, in which.

It is to be understood that, in the drawings, like reference numerals designate like structural elements. Also, it is understood that the depictions in the FIGS. are not necessarily to scale.

DETAILED DESCRIPTION OF THE PREFERRED EMBODIMENTS

In the following description, numerous specific details are set forth to provide a thorough understanding of the present invention. It will be apparent, however, to one skilled in the art that the present invention may be practiced without some or all of these specific details. In other instances, well known process steps have not been described in detail in order to avoid unnecessarily obscuring the present invention.

Figure 1A:
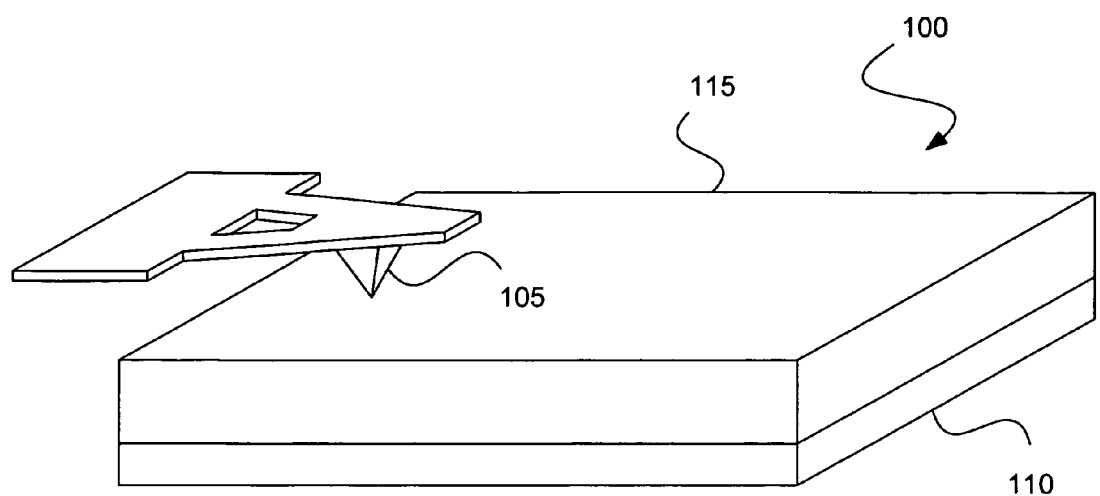
FIG. 1A depicts a perspective view of an exemplary two terminal memory with a movable terminal.

FIG. 1A depicts a perspective view of an exemplary two terminal memory 100 with a movable terminal. The two terminals are the probe 105 and the bottom electrode 110 of the memory storage medium 115. The system can be configured so that either the probe 105 moves and the storage medium 115 stays stationary, the storage medium 115 moves and the probe 105 stays stationary, or both the probe 105 and the storage medium 115 are movable. For simplicity, a movable probe 105 will be described, but it should be understood that the described movement is only relative to the storage medium 115, and may not necessarily be relative to the entire storage system, which may include the peripheral circuitry and servos (not shown).

The movement of the probe 105 will typically dictate the size and shape of a bit block. For example, if the probe 105 can only move in the y-direction, then each bit block would essentially be a narrow strip of the storage medium 115. If the probe 105 could move in two dimensions, then a bit block could be either rectangular or square in shape. If the probe only moved in a radial direction (with, for example, the storage medium 115 on a rotating platter), then a bit block could be a circular track or a portion of a circular track.

A bit block is a portion of storage medium 115 that is capable of returning data corresponding to a single data line in a data bus in a memory organized in words. For example, if a 64 bit word is stored in a binary medium, 64 bit blocks would communicate with 64 data lines in order to store the word (as will be described later, some mediums can store more than two memory states, reducing the number of bit blocks that are needed). In this example, the first bit block would always store and return the most significant bit (MSB) of the 64 bit word on the first data line; the second bit block would always store and return the second significant bit of the 64 bit word on the second data line, etc. The position of the probe 105 would determine the address of the 64 bit word. All the probes 105 in each bit block would typically move together so that a certain address would cause all the probes to read a bit in one area of each bit block while another address could cause all the probes to read a bit from another area. Therefore, each bit block can have many memory elements corresponding to many addresses. The location of the probe 105 within the bit block will determine which element is read.

Figure 1B:
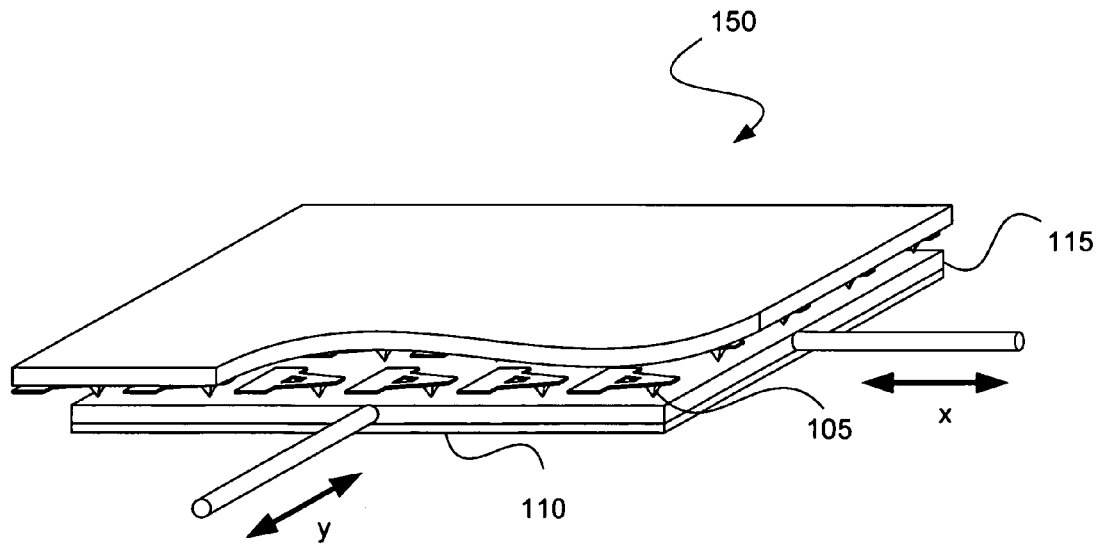
FIG. 1B depicts a perspective view of an exemplary memory using multiple bit blocks.

FIG. 1B depicts a perspective view of an exemplary memory 150 using multiple bit blocks. It will be appreciated by those skilled in the art that designing a memory that is massively parallel with at least a thousand bit blocks can be advantageous in certain systems. Of course, specific system requirements would dictate whether a higher or lower level of parallelism is useful. Movement can be achieved with the use of electrostatic, piezoelectric or other microelectronic mechanical system (MEMS) movement mechanisms.

Those skilled in the art will similarly appreciate that probe movement typically requires a positioning system. The probes 105 will typically need to go to a recognized location before attempting to move to another address location. Various techniques might be utilized, including storing certain sequences of data as a servo codes or physically changing the top surface of the storage medium 115 through lithography, etching, and/or deposition of patterned materials in order to create a servo pattern of guides. Magnetic hard drives that have rotating platters use both embedded and dedicated servo codes. Embedded servo codes are scattered among the data in non-writeable and engineered positions. In magnetic hard drives dedicated servo codes are written completely on one side of each platter. Since all the probes 105 will typically move together, a bit block (or a group of bit blocks) could be engineered to hold dedicated servo codes instead of data so that all the other probes will always be accurately positioned.

Probes 105 are very similar to probes used in scanning probe microscopy (SPM). The text, "A Practical Guide to Scanning Probe Microscopy," by Rebecca Howland and Lisa Benatar, March 2000 edition, hereby incorporated by reference for all purposes, describes many types of probes used in different SPMs, various scanner designs and operation. SPMs described by the text include scanning tunneling microscopes (STM), atomic force microscopes (AFM), magnetic force microscopy (MFM), lateral force microscopy (LFM), force modulation microscopy (FMM), phase detection microscopy (PDM), electrostatic force microscopy (EFM), scanning capacitance microscopy (SCM), scanning thermal microscopy (SThM), near-field scanning optical microscopy (NSOM), pulsed force mode.

Figure 2:
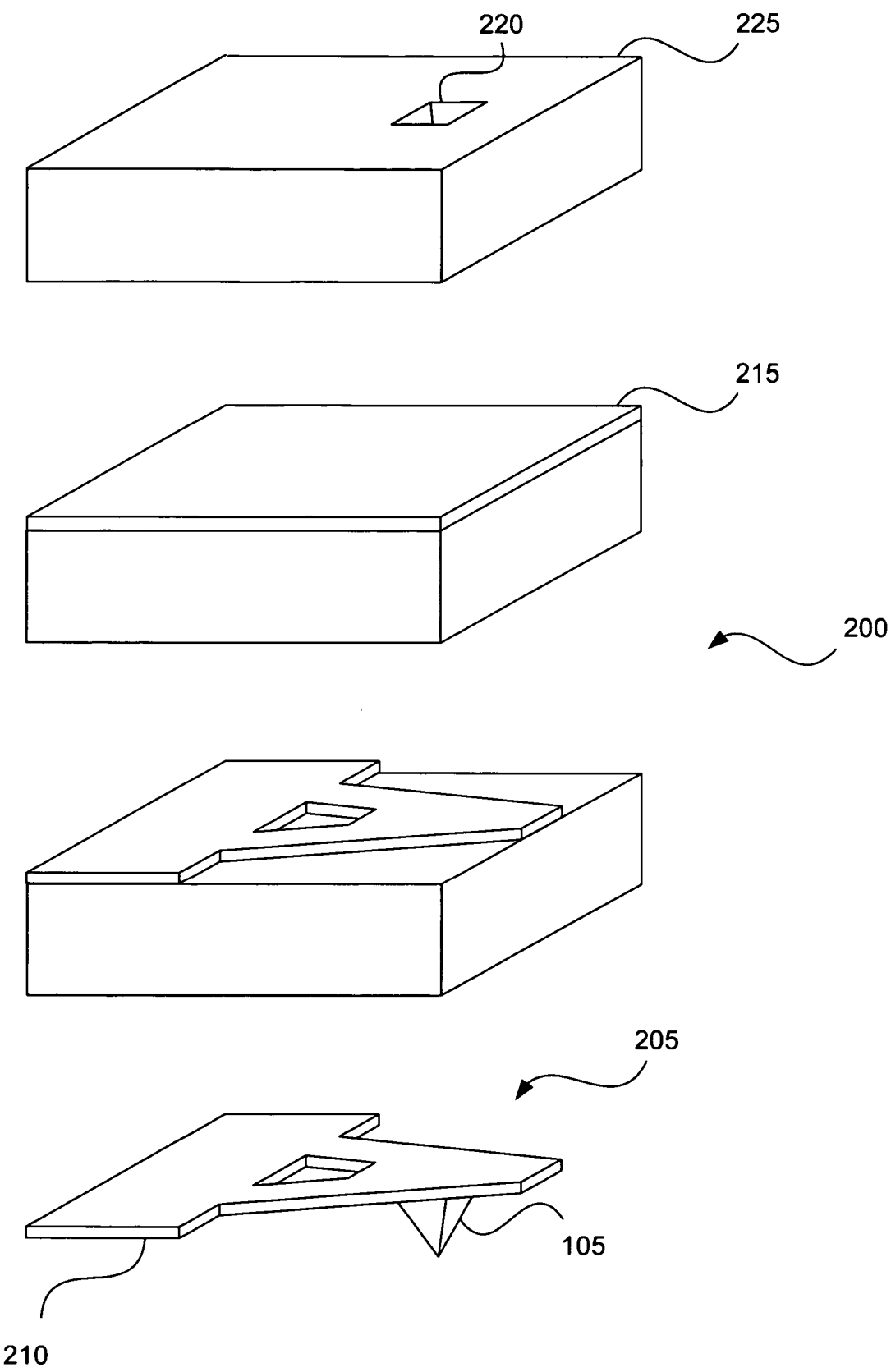
FIG. 2 depicts perspective views of an exemplary fabrication process for a cantilevered probe.

Most probes 105 will have similar construction to SPM probes. FIG. 2 depicts perspective views of an exemplary fabrication process 200 for a cantilevered probe 205. The cantilever portion 210 supports the probe 105, which is typically fabricated by depositing a layer of silicon nitride 215 over an etched pit 220 in a crystalline silicon surface 225. Silicon nitride films, however, contain residual stresses that typically make them deform as the film thickness increases. Accordingly, the thickness of silicon nitride cantilevers is usually less than one micron, whereas other cantilever materials, such as silicon, can be several microns thick.

The major distinction between the probes used in SPM and the probes 105 of the present invention is the ability to modify the electrical properties of the storage medium 115. Although certain SPMs have been used to modify the surface properties of a sample in the past (for example, using nanolithography, heat and/or force to deform the surface) the present invention relies on the probes 105 to not only assist in reading data out of the storage medium 115, but also modifying the electrical characteristics of the storage medium 115 itself so that, in one embodiment, a memory effect is created. Accordingly, most cantilevered probes 205 will be conductive and, therefore, may require a coating of conductive material if the cantilevered probe 205 is not natively conductive. Conductive cantilevers can be made with numerous materials, including doped Si, Pt-coated Si, Pt/Ir alloy-coated Si, boron-doped diamond-like carbon (DLC) Si, Tungsten, and Tungsten-carbide. As will be described later, it may be beneficial to have a tunneling barrier between the two terminals as part of the memory element. This tunneling barrier could be attached directly to the probe tip 105 with a coating. This tunneling barrier portion of the probe tip 105 would, therefore, be considered part of the memory element.

The memory effect is a hysteresis that exhibits a resistive state change upon application of a voltage while allowing non-destructive reads. A non-destructive read means that the read operation has no appreciable effect on the resistive state of a memory element. A memory element is the portion of the storage medium 115 underneath the conductive portion of the probe 105 and above the conductive portion of the bottom electrode 110 that holds information. In one embodiment a write voltage of one polarity ($+V_W$) causes the conduction mechanism(s) of the storage medium 115 to become less conductive (more resistive) while a write voltage of another polarity ($-V_W$) causes the conduction mechanism(s) of the storage medium 115 to become more conductive (less resistive).

Measuring the resistance of a memory element can be accomplished by detecting either current after the memory element is held to a known voltage, or voltage after a known current flows through the memory element. Therefore, a memory element that is placed in a high resistive state $R_0$ upon application of $-V_W$ and a low resistive state $R_1$ upon application of $+V_W$ should be unaffected by a read operation performed at $-V_R$ or $+V_R$. In such materials a write operation is not necessary after a read operation. It should be appreciated that the magnitude of $|-V_W|$ may not necessarily equal the magnitude of $|+V_W|$ in materials where opposite polarities are used.

It is possible to have a memory element that can be switched between resistive states with voltages of the same polarity. For example, in the paper "The Electroformed metal-insulator-metal structure: a comprehensive model," by R. E. Thurstans and D. P. Oxley 35 J. Phys. D. Appl. Phys. 802-809, incorporated herein by reference for all purposes, describes a memory that maintains a low resistive state until a certain $V_P$ is reached. After $V_P$ is reached the resistive state can be increased with voltages. After programming, the high resistive state is then maintained until a certain $V_T$ is reached. The $V_T$ is sensitive to speed at which the program voltage is removed from the memory cell. In such a system, programming $R_1$ would be accomplished with a voltage pulse of $V_P$, programming $R_0$ would be accomplished with a voltage pulse greater than $V_P$, and reads would occur with a voltages below $V_T$. Intermediate resistive states (for multi-level memory element) are also possible.

Mechanisms for creating the memory effect have been discussed in various papers, patents and patent applications. For example, U.S. Pat. No. 6,204,139, issued Mar. 20, 2001 to Liu et al., incorporated herein by reference for all purposes, describes some perovskite materials that exhibit memory characteristics. The perovskite materials are also described by the same researchers in "Electric-pulse-induced reversible resistance change effect in magnetoresistive films," Applied Physics Letters, Vol. 76, No. 19, 8 May 2000, and "A New Concept for Non-Volatile Memory: The Electric-Pulse Induced Resistive Change Effect in Colossal Magnetoresistive Thin Films," in materials for the 2001 Non-Volatile Memory Technology Symposium, all of which are hereby incorporated by reference for all purposes.

In U.S. Pat. No. 6,531,371 entitled "Electrically programmable resistance cross point memory" by Hsu et al, incorporated herein by reference for all purposes, discloses resistive cross point memory devices along with methods of manufacture and use. The memory device comprises an active layer of perovskite material interposed between upper electrodes and lower electrodes. Similarly, U.S. Pat. No. 6,473,332, entitled "Electrically Variable Multi-State Resistance Computing" by Ignatiev et al, incorporated herein by reference for all purposes, discloses resistive memory devices using colossal magnetoresistive oxides. Other types of materials may also be useful, such as the phase change materials described in U.S. Pat. No. 5,296,716 entitled "Electrically Erasable, Directly Overwritable, Multibit Single Cell Memory Elements and Arrays Fabricated Therefrom" by Ovshinsky et al, incorporated herein by reference for all purposes.

Similarly, the IBM Zurich Research Center has also published three technical papers that discuss the use of metal oxide material for memory applications: "Reproducible switching effect in thin oxide films for memory applications," Applied Physics Letters, Vol. 77, No. 1, 3 Jul. 2000, "Current-driven insulator-conductor transition and nonvolatile memory in chromium-doped $SrTiO_3$ single crystals," Applied Physics Letters, Vol. 78, No. 23, 4 Jun. 2001, and "Electric current distribution across a metal-insulator-metal structure during bistable switching," Journal of Applied Physics, Vol. 90, No. 6, 15 Sep. 2001, all of which are hereby incorporated by reference for all purposes.

Additionally, various co-pending applications also discuss methods for creating a memory effect, including: U.S. application Ser. No. 10/604,606, (now U.S. Pat. No. 7,071,008) filed Aug. 4, 2003, titled "Multi-Resistive State Material That uses Dopants"; U.S. application Ser. No. 10/634,636, (now U.S. Pat. No. 7,038,935) filed Aug. 4, 2003, titled "A 2-Terminal Trapped Charge Memory Device with Voltage Switchable Multi-Level Resistance"; U.S. application Ser. No. 10/682,277, (now U.S. Pat. No. 7,067,862) filed Oct. 8, 2003, titled "Conductive Memory Device with Barrier Electrodes"; U.S. application Ser. No. 10/605,757, (now U.S. Pat. No. 6,965,137) filed Oct. 23, 2003, titled "Multi-Layer Conductive Memory Device"; U.S. application Ser. No. 10/665,882, (now U.S. Pat. No. 6,965,137) filed Sep. 19, 2003, titled "Resistive Memory Device with a Treated Interface"; U.S. application Ser. No. 10/773,549, (now U.S. Pat. No. 7,326,979) filed Feb. 6, 2004, titled "Multi-Resistive State Element With Reactive Metal"; U.S. application Ser. No. 10/868,578, (now U.S. Pat. No. 6,972,985) filed Jun. 15, 2004, titled "Memory Element Having Islands"; and U.S. application Ser. No. 10/934,951, (now U.S. Pat. No. 7,538,338) filed Sep. 3, 2004, titled "Memory Using Variable Tunnel Barrier Widths"; all of which are hereby incorporated by reference in their entireties and for all purposes. Accordingly, a change in resistivity or resistive states could be accomplished by any number of mechanisms. For example, in the Abstract of the above-referenced U.S. Pat. No. 7,538,338, a conductive material that "has mobile ions that either move towards or away from the tunneling barrier in response to a voltage across the memory element" is described as promoting a memory effect. The Patent goes on to describe the specific embodiment of oxygen ions being the mobile ions that move out of a conductive metal oxide and into a tunnel barrier during a programming operation, and vice-versa during an erase operation. Another possible method of creating the memory effect is to use a local electrical field to oxidize and reduce small regions on the surface of the storage medium. When these oxides are coupled with a tunnel barrier, small changes in the total insulating barrier thickness would result in large changes in resistance. Once oxidized with an electric field of a first polarity, the thermodynamic stability of an oxide would determine the ease at which the material could be reduced by an electric field of opposite polarity.

Figure 3:
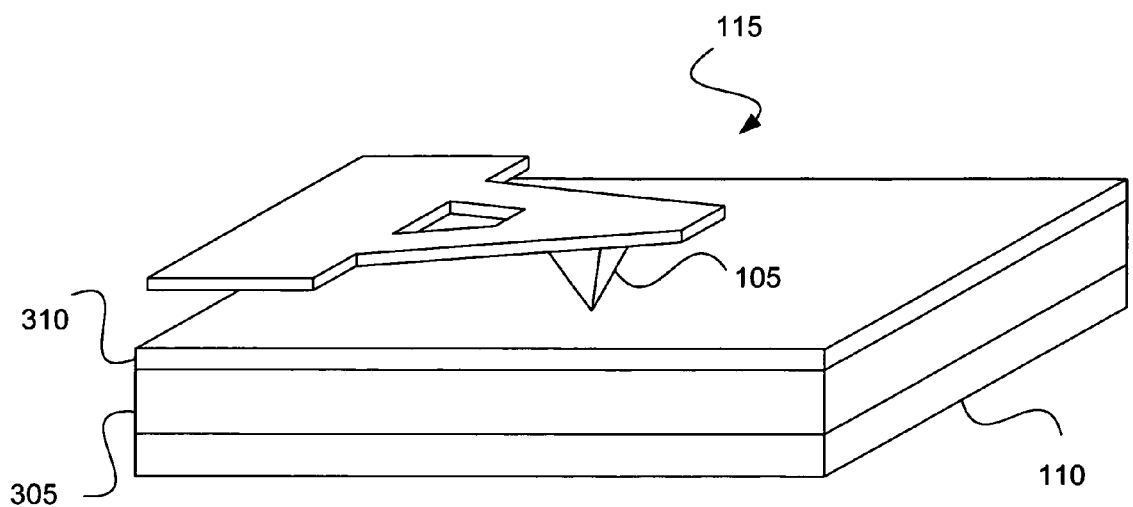
FIG. 3 depicts a perspective view of an exemplary storage medium using a storage mechanism that changes a memory element's resistance with voltage.

FIG. 3 is a block diagram of an exemplary storage medium 115 using a storage mechanism that changes a memory element's resistance with voltage without changing phase. Phase change materials are those classes of materials that can be observed, through high resolution lattice imaging with electron transmission microscopy, to have changed between amorphous and crystalline states in response to controlled heating and cooling. Although phase change materials can transition in response to electrical heating, the current required is generally very high. Accordingly, in a preferred embodiment of the present invention, the storage mechanism is not changing phase. In the exemplary storage medium 115 of FIG. 3 a conductive metal oxide 305 is combined with a tunnel barrier 310 in order to create a memory element. The memory element changes its resistance based upon the voltage between the probe 105 and the bottom electrode 110, retaining such resistance until programmed with a voltage of an opposite polarity. Many conductive metal oxides are useful in a memory element, including some mixed valence oxides, which transport electricity through both electron and ionic motion, and many perovskites.

In one specific embodiment, the depositions might be sputter-deposited using a KLJC CMS-18HV Dual Chamber Thin Film Deposition System. Each chamber being pumped with a 1000 liter/sec magnetically levitated turbo-molecular pump and backed with a dry scroll pump to assure a clean deposition chamber environment with a low base pressure of less than $5 \times 10^{-8}$ Torr.

The substrate might be a previously deposited multilayer composed of 1000 Angstrom sputtered layer of $TiO_2$ deposited on a 500 Angstrom layer of a thermally grown $SiO_2$ on a 100 mm diameter n-type silicon wafer, plasma cleaned for 1 minute with 100 watts rf power applied to the substrate in 10 mTorr of argon.

The bottom electrode 110 might be a 500 Angstrom layer of platinum, DC magnetron sputtered with 180 watts applied to a platinum target in 4 mTorr of argon at 450° C. and then cooled in-situ for at least 10 minutes in the sputter ambient gas environment of 4 mTorr of argon.

The conductive metal oxide 305 might be a 500 Angstrom layer of a PCMO perovskite, rf magnetron sputtered in 10 mTorr of argon at 550° C. by applying 120 watts to a $Pr_{0.7}Ca_{0.3}MnO_3$ target (made with hot isostatic pressing or HIP), afterwards cooled in-situ for 10 minutes in the sputter ambient gas environment of 10 mTorr of argon, then cooled for another 10 minutes in a load lock chamber at 600 Torr of oxygen.

The tunnel barrier 310 might be 30 Angstroms of some type of AlOx, rf magnetron sputtered in 4 mTorr of argon with 1% oxygen at 300° C. by applying 150 watts to an $Al_2O_3$ target (also made with HIP), and then annealed for 30 minutes at 250° C. in the sputter ambient gas environment of 4 mTorr of argon with 1% $O_2$.

Figure 4A:
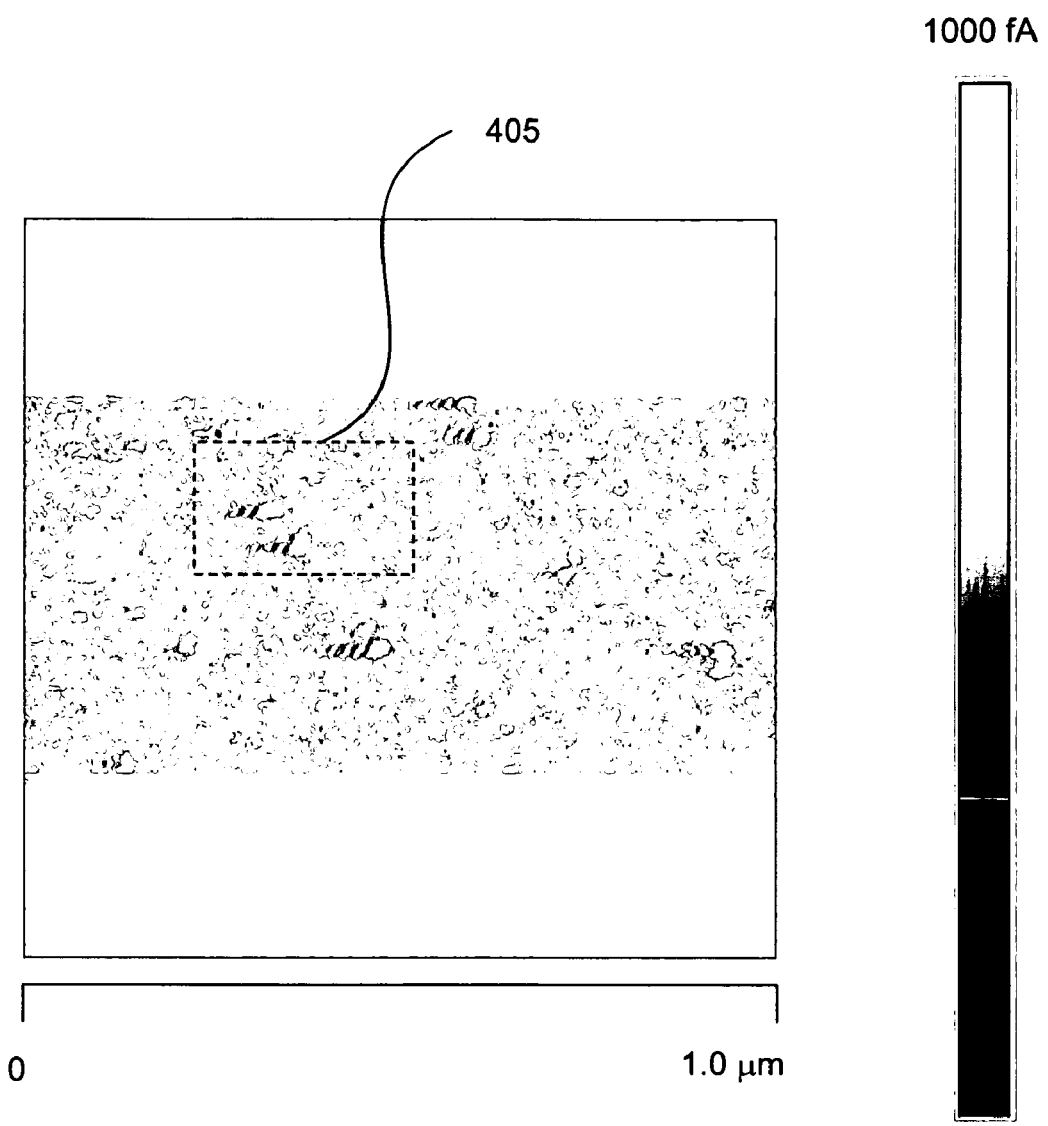
FIGS. 4A through 4C depict perspective conductivity scans of a storage medium taken before and after programming.

FIG. 4A depicts a portion of a memory element surface deposited under the above-described conditions. The picture was taken with a Scanning Probe Microscope under a −1.5 V bias utilizing a Nanoscope IV SPM controller having additional Conductive Atomic Force Microscopy (CAFM) image mode capability with the extended Tunneling AFM (TUNA) gain stages for low current resolution (available gain stages of 1 pA/V, 10 pA/V, 1 nA/V, and 100 nA/V). CAFM performs general-purpose measurements, and has a current range of 2 pA to 1 μA while TUNA characterizes ultra-low currents (<1 pA) through the thickness of thin films. Conductive tips were Pt/Ir alloy-coated Si with a nominal tip diameter of 20-25 nm.

FIG. 4A is strongly suggestive of a conduction mechanism that is dominated by conduction at discrete points, assuming a probe 105 that is on the order of hundreds of nanometers. If smaller probes 105 were desired, greater uniformity could be achieved with other deposition techniques and/or different material choices.

Figure 4B:
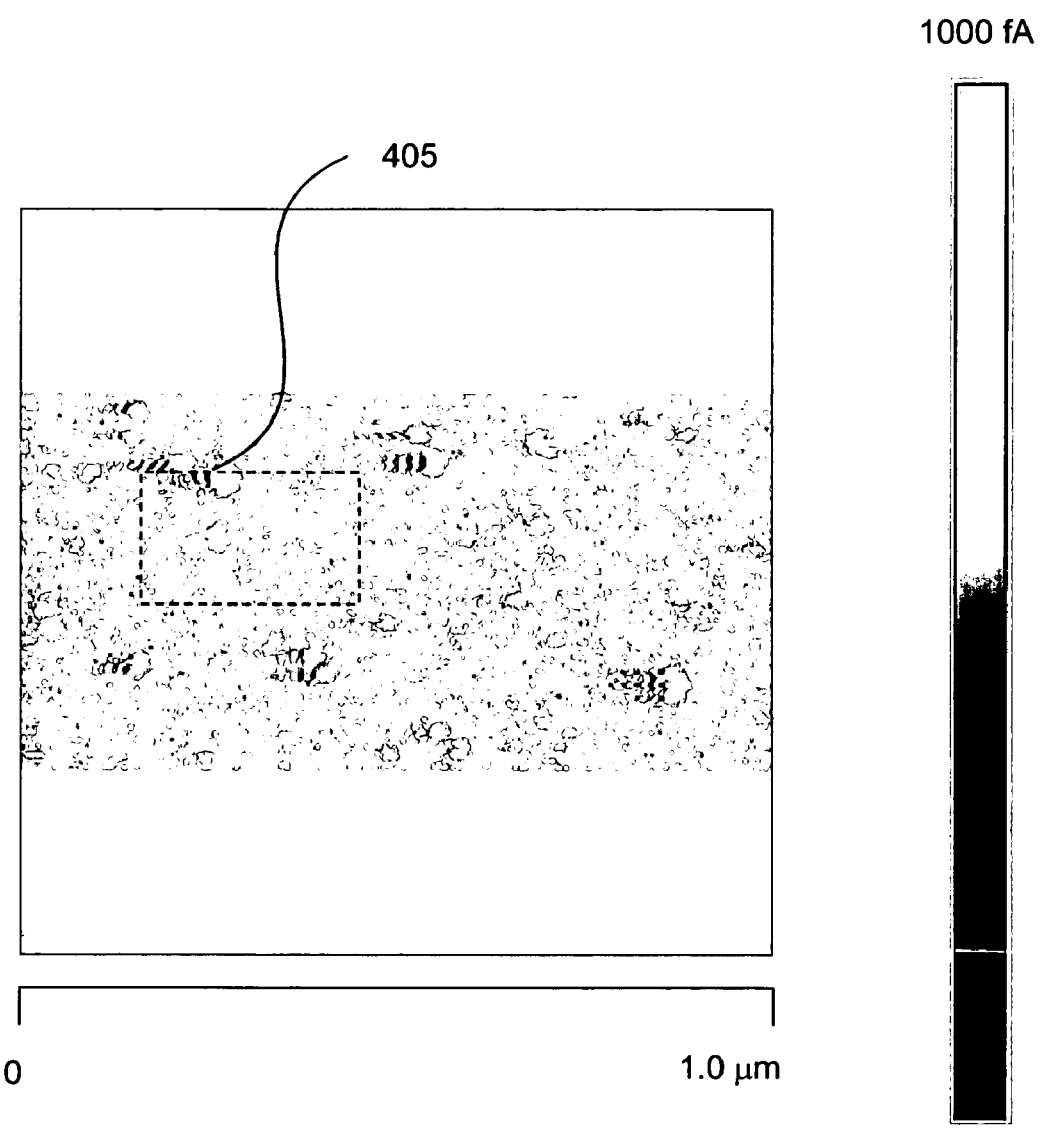

FIG. 4B depicts a portion of the same surface taken on the scanning probe microscope at −1.5 V bias applied to the top electrode after an area 405 of about 330 nm in length was scanned with a 4V bias. If a probe 105 with a tip of a size comparable to the area 405 were being used, a 4V programming pulse would likely result in a less conductive memory element.

Figure 4C:
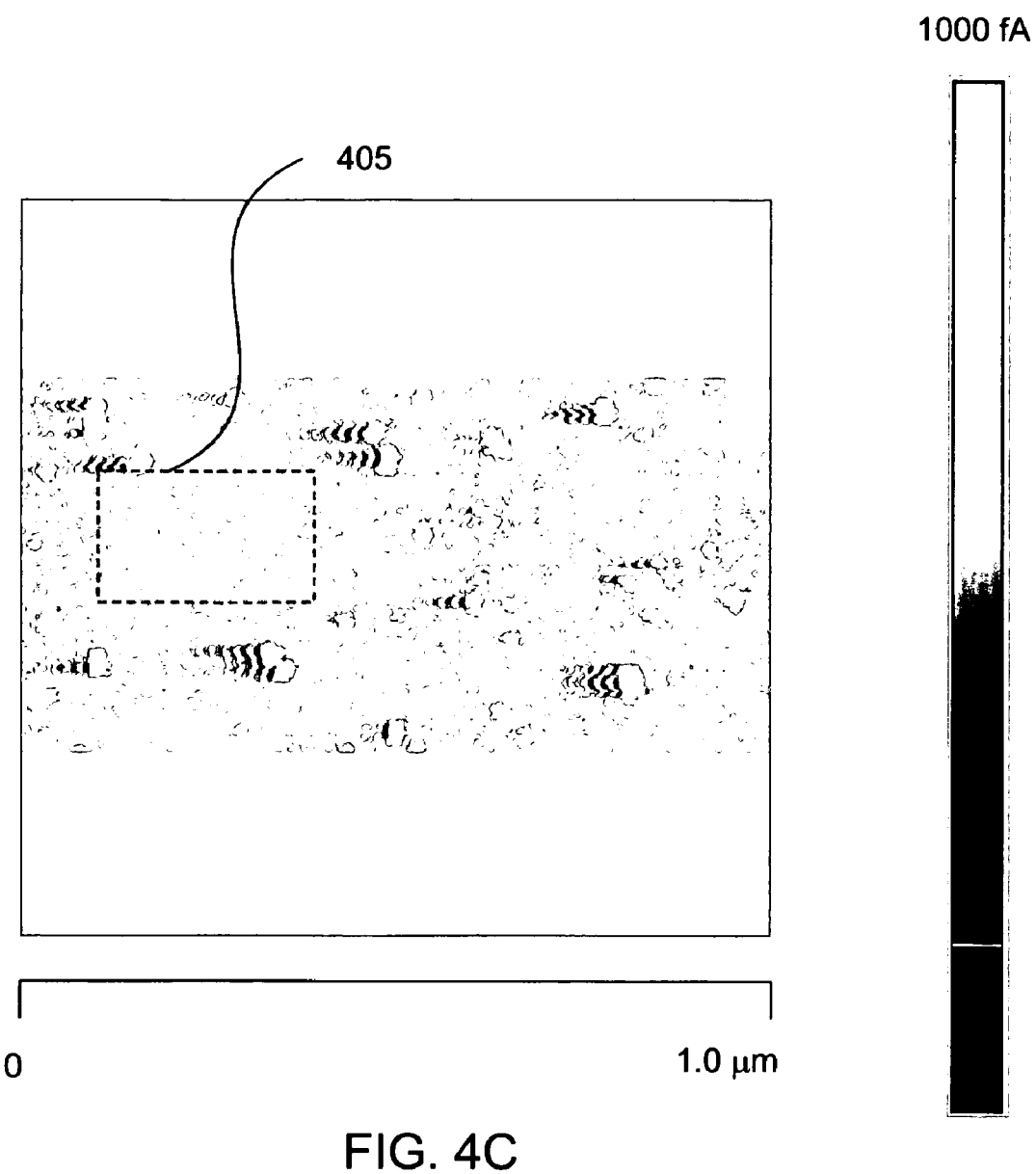

FIG. 4C depicts a potion of the same surface taken on the scanning probe microscope at −1.5 V bias after the area 405 was scanned with a 5V bias. The discrete points of conductivity are almost completely removed, clearly resulting in an overall increase in resistance. The data from the scanning probe microscope is clearly applicable to the present invention.

Referring back to FIG. 1B, the entire bottom electrode 110 could be held to a certain voltage while the probes 105 would cause current to flow through the memory element for read operations and write operations. Each of the probes 105 could simultaneously read a memory element in that probe's bit block. Write operations could be performed by holding the holding the bottom electrode 110 to ground, certain probes to +$V_W$ and other probes to −$V_W$, as necessary. Furthermore, co-pending U.S. patent application Ser. No. 10/680,508, filed Oct. 6, 2003, now issued U.S. Pat. No. 6,940,744, titled "An Adaptive Programming Technique for a Re-Writable Conductive Memory Device," hereby incorporated herein by reference, describes a feedback system of applying voltages that provides only the voltage necessary to place a memory element in the appropriate resistive state, and could be used in the present invention.

Additionally, electrostatic repulsive forces could also be used to adaptively program an element. When two objects having electric charge are brought into each other's vicinity, an electrostatic force is manifested between them. If the electric charges are of the same polarity, the electrostatic force is repulsive. If the electric charges are of opposite polarity, the electrostatic force is attractive. The insulating tunnel barrier 310 and the conductive metal oxide 305 act as a parallel plate capacitor, storing charge that contributes to the electrostatic force. As the storage medium 115 changes its capacitance in response to programming pulses, the electrostatic forces between the probe 105 and the surface of the storage medium 115 also changes, providing the system with a technique to automatically sense when programming of the memory element is complete.

The values of +$V_W$ and −$V_W$ may be dependant on the length of the pulses involved, and will typically have an absolute value of not greater than 20 V, the approximate breakdown voltage of the material. Similarly, the value of either −$V_R$ or +$V_R$ (or both if both positive and negative read voltages are used) is also dictated by how fast a read is desired.

The probe 105 will therefore need to be able to withstand the appropriate voltages. Additionally, as long as the bottom electrode 110 is a single conducting layer that provides a common node for all the bit blocks, the memory element states would need to be read by the probe 105. Accordingly, a sensing device such as a sense amplifier would be coupled to the probe 105. However, if the bottom electrode 110 were segmented into bit-block sized areas, then each bottom electrode 110 segment could be individually controlled and sensed. Such a system might be desirable if the probes 105 were not capable of carrying the entire voltage necessary to read or write to the memory elements. Furthermore, if the storage medium 110 were deposited directly on circuitry (either directly related to the memory's functionality such as drivers, decoders, or sense amplifiers, or completely unrelated to the memory's operation) the segmented bottom electrodes 110 could be fabricated as a metallization layer.

The probe 105 can either come into physical contact with the storage medium 115, or can hover above the surface. Non-contact SPM probes are typically held on the order of tens to hundreds of Angstroms from the sample surface. In one embodiment, the probe 105 can be any distance away from the surface (or in contact with the surface) as long as it is able to provide a voltage drop across the memory element. Furthermore, the distance from the surface can be engineered so that the space in between the probe 105 and the surface of the storage medium 115 acts as an additional tunnel barrier. If the probes 105 were able to move up and down (in the z direction) then it would be possible to use the same voltage for writes and reads, changing only the distance to the storage medium 115. Additionally, moving the probes 105 up and down might be beneficial in certain embodiments so that the probes are not dragged across the surface of the storage medium 115 when being moved.

Although the invention has been described in its presently contemplated best mode, it is clear that it is susceptible to numerous modifications, modes of operation and embodiments, all within the ability and skill of those familiar with the art and without exercise of further inventive activity. Furthermore, any theoretical mechanisms have been described for ease of understanding and the inventors do not wish to be bound by theory. Accordingly, that which is intended to be protected by Letters Patent is set forth in the claims and includes all variations and modifications that fall within the spirit and scope of the claims.

What is claimed is:

1. An apparatus comprising:
   a plurality of first electrodes;
   at least one second electrode; and
   a storage medium fixed to the at least one second electrode and electrically coupled to both the plurality of first electrodes and the at least one second electrode, the storage medium having a plurality of memory elements, each memory element having a conductance that is responsive to a write voltage across one of the first electrodes and the at least one second electrode without the storage medium undergoing a phase change and without the plurality of first electrodes applying heat or force to deform a surface of the storage medium;
   wherein the plurality of first electrodes are movable relative to the at least one second electrode,
   wherein the storage medium includes a conductive metal oxide and a tunnel barrier in contact with the conductive metal oxide, forming an interface between the conductive metal oxide and the tunnel barrier, and
   wherein the write voltage causes oxygen ions to move across the interface.

2. The apparatus of claim 1 wherein the tunnel barrier is $AlO_x$.

3. The apparatus of claim 1, wherein the plurality of first electrodes experience an electrostatic force with the storage medium, the electrostatic force being useful to adaptively program the storage medium.

4. An apparatus comprising:
   a plurality of first electrodes;
   at least one second electrode; and
   a storage medium fixed to the at least one second electrode and electrically coupled to both the plurality of first electrodes and the at least one second electrode, the storage medium having a plurality of memory elements, each memory element having a conductance that is responsive to a write voltage across one of the first electrodes and the at least one second electrode without the storage medium undergoing a phase change and without the plurality of first electrodes applying heat or force to deform a surface of the storage medium;

wherein the plurality of first electrodes are movable relative to the at least one second electrode, wherein the storage medium includes a conductive metal oxide and a tunnel barrier in contact with the conductive metal oxide, and wherein the conductive metal oxide comprises $Pr_{0.7}Ca_{0.3}MnO_3$.

5. An apparatus comprising:
a plurality of first electrodes;
at least one second electrode; and
a storage medium fixed to the at least one second electrode and electrically coupled to both the plurality of first electrodes and the at least one second electrode, the storage medium having a plurality of memory elements, each memory element having a conductance that is responsive to a write voltage across one of the first electrodes and the at least one second electrode without the storage medium undergoing a phase change and without the plurality of first electrodes applying heat or force to deform a surface of the storage medium;

wherein the plurality of first electrodes are movable relative to the at least one second electrode and wherein the conductance of the storage medium is responsive to the write voltage through oxidation and reduction reactions.

6. An apparatus comprising:
a first electrode;
a second electrode; and
a microelectronic mechanical system movement mechanism that moves the first electrode relative to the second electrode;

wherein a read current across the electrodes is indicative of stored data;

wherein a first write voltage across the electrodes is effective to store a first data value and a second write voltage across the electrodes is effective to store a second data value, the first data value and the second data value are stored without surface deformation created by the application of heat or force by the first electrode or the second electrode, wherein a tunnel barrier is disposed between the two electrodes, and wherein the first write voltage causes oxygen ions to move out of the tunnel barrier and the second write voltage causes oxygen ions to move into the tunnel barrier.

7. The apparatus of claim 6 wherein the first electrode is a cantilevered probe.

8. The apparatus of claim 6 wherein the tunnel barrier is fixed to the first electrode.

9. The apparatus of claim 6 wherein the tunnel barrier is fixed to the second electrode.

10. The apparatus of claim 6 further comprising a plurality of first electrodes, wherein each first electrode is separately controllable, such that different first electrodes can be held to different voltages at the same time.

11. An apparatus comprising:
a first electrode;
a second electrode; and
a microelectronic mechanical system movement mechanism that moves the first electrode relative to the second electrode, wherein a read current across the electrodes is indicative of stored data;

wherein a first write voltage across the electrodes is effective to store a first data value and a second write voltage across the electrodes is effective to store a second data value, wherein the voltage across the electrodes is not sufficient to cause a phase change of any materials disposed between the electrodes and the first data value and the second data value are stored without the application of heat or force by the first electrode or the second electrode and without deforming a surface of the any materials disposed between the electrodes, wherein the materials disposed between the electrodes includes a conductive metal oxide and a tunnel barrier in contact with the conductive metal oxide, and wherein the first write voltage causes oxygen ions to move from the conductive metal oxide into the tunnel barrier and the second write voltage causes oxygen ions to move from the tunnel barrier into the conductive metal oxide.

* * * * *

UNITED STATES PATENT AND TRADEMARK OFFICE
CERTIFICATE OF CORRECTION

PATENT NO. : 7,701,834 B2 Page 1 of 1
APPLICATION NO. : 11/037971
DATED : April 20, 2010
INVENTOR(S) : Darrell Rinerson et al.

It is certified that error appears in the above-identified patent and that said Letters Patent is hereby corrected as shown below:

On the title page, item (75) Inventors:

replace "Lawerence"

with "Lawrence".

Signed and Sealed this

Thirty-first Day of August, 2010

David J. Kappos
*Director of the United States Patent and Trademark Office*